(12) United States Patent
Cheng

(10) Patent No.: US 10,459,488 B1
(45) Date of Patent: Oct. 29, 2019

(54) DOCKING STATION

(71) Applicant: Getac Technology Corporation, Hsinchu County (TW)

(72) Inventor: Kuo-Heng Cheng, Taipei (TW)

(73) Assignee: GETAC TECHNOLOGY CORPORATION, Hsinchu County (TW)

( * ) Notice: Subject to any disclaimer, the term of this patent is extended or adjusted under 35 U.S.C. 154(b) by 0 days.

(21) Appl. No.: 16/157,452

(22) Filed: Oct. 11, 2018

(51) Int. Cl.
*G06F 1/16* (2006.01)

(52) U.S. Cl.
CPC .................................. *G06F 1/1632* (2013.01)

(58) Field of Classification Search
CPC .................................................... G06F 1/1632
See application file for complete search history.

(56) References Cited

U.S. PATENT DOCUMENTS

| | | | | |
|---|---|---|---|---|
| 5,687,060 | A * | 11/1997 | Ruch | G06F 1/1632 361/679.43 |
| 6,208,508 | B1 * | 3/2001 | Ruch | G06F 1/1632 361/679.41 |
| 7,679,902 | B2 * | 3/2010 | Thompson | G06F 1/1632 361/679.44 |
| 7,839,118 | B2 * | 11/2010 | Carnevali | G06F 1/1632 320/107 |
| 7,911,779 | B1 * | 3/2011 | Tarnoff | G06F 1/1626 361/679.43 |
| 7,924,559 | B2 * | 4/2011 | Kuo | G06F 1/1632 361/679.41 |
| 8,182,426 | B2 * | 5/2012 | Zhao | A61B 8/00 361/679.21 |
| 8,315,048 | B2 * | 11/2012 | Tarnoff | G06F 1/1626 361/679.43 |
| 9,163,779 | B2 * | 10/2015 | Funk | F16M 13/02 |
| 9,471,103 | B2 * | 10/2016 | Shibuya | G06F 1/163 |
| 9,612,616 | B2 * | 4/2017 | Tarnoff | G06F 1/1626 |
| 9,706,026 | B2 * | 7/2017 | Carnevali | G06F 1/1628 |
| 9,898,041 | B2 * | 2/2018 | Blowers | G06F 1/1632 |
| 9,945,159 | B2 * | 4/2018 | Carnevali | E05B 17/2038 |
| 9,964,992 | B2 * | 5/2018 | Tarnoff | G06F 1/1626 |
| 10,061,354 | B2 * | 8/2018 | Pischel | H05K 5/0221 |
| 2011/0266230 | A1 * | 11/2011 | Carnevali | E05B 17/2038 70/58 |
| 2012/0134102 | A1 * | 5/2012 | Sullivan | G06F 1/1616 361/679.43 |
| 2013/0092811 | A1 * | 4/2013 | Funk | F16M 13/02 248/371 |
| 2018/0232007 | A1 * | 8/2018 | Tarnoff | G06F 1/1626 |

* cited by examiner

Primary Examiner — Lisa Lea-Edmonds
(74) Attorney, Agent, or Firm — Locke Lord LLP; Tim Tingkang Xia, Esq.

(57) ABSTRACT

The application discloses a docking station including a base and a clamp member. The base includes a seat, and an extension portion connected to the seat and extending upwards. The clamp member is assembled at the extension portion, and includes a body, a hook portion and a resilient element. The body is assembled at the extension portion. The hook portion is provided at an end portion of the body. The resilient element is provided at the body and is near the hook portion. When the hook portion receives a force, the body is elastically deformed and drives the resilient element to produce an elastic restoring force; when the hook portion does not receive a force, the elastic restoring force of the resilient element drives the body to restore to an initial position.

13 Claims, 5 Drawing Sheets

DOCKING STATION

BACKGROUND OF THE INVENTION

Field of the Invention

The present invention relates to a docking station, and more particularly to a docking station performing clamping through an elastic restoring force.

Description of the Prior Art

With the development of technologies, various types of electronic devices commonly and indispensably exist in people's lives. Thus, portable electronic devices, such as tablet computers or smart phones, are more frequently used and favored by users compared to laptop computers.

To alleviate the burden of users carrying portable electronic devices, portable electronic devices generally have simple mechanisms and are small in volume and light in weight, as main features thereof. Hence, readily portable electronic devices are not usually equipped with stands or frames that can be erected in a utilization environment. When a user needs to use a portable electronic device for an extended period of time or at a fixed location, the electronic device needs to be mounted on a docking station, which then supports the electronic device for further use of the user. However, the Applicant considers that commercially available docking stations still suffer from issues of having complicated structures and requiring rather complex user operations.

SUMMARY OF THE INVENTION

The present application discloses a docking station including a base and a clamp member. The base includes a seat, and an extension portion connected to the seat and extending upwards. The clamp member is assembled at the extension portion, and includes a body, a hook portion and a resilient element. The body is assembled at the extension portion. The hook portion is provided at an end portion of the body. The resilient element is provided at the body and near the hook portion. When the hook portion receives a force, the body is elastically deformed and drives the resilient element to produce an elastic restoring force; when the hook portion does not receive a force, the elastic restoring force of the resilient element drives the body to restore to an initial position.

Thus, the clamp member of the present application becomes located away from the base when receiving a force, so as to allow an electronic device to be placed between the clamp member and the base. Further, after the force is released when the electronic device is placed between the clamp member and the base, the clamp member is elastically restored to the initial position to clamp the electronic device, providing convenient operations.

DETAILED DESCRIPTION OF THE EMBODIMENTS

Figure 1:
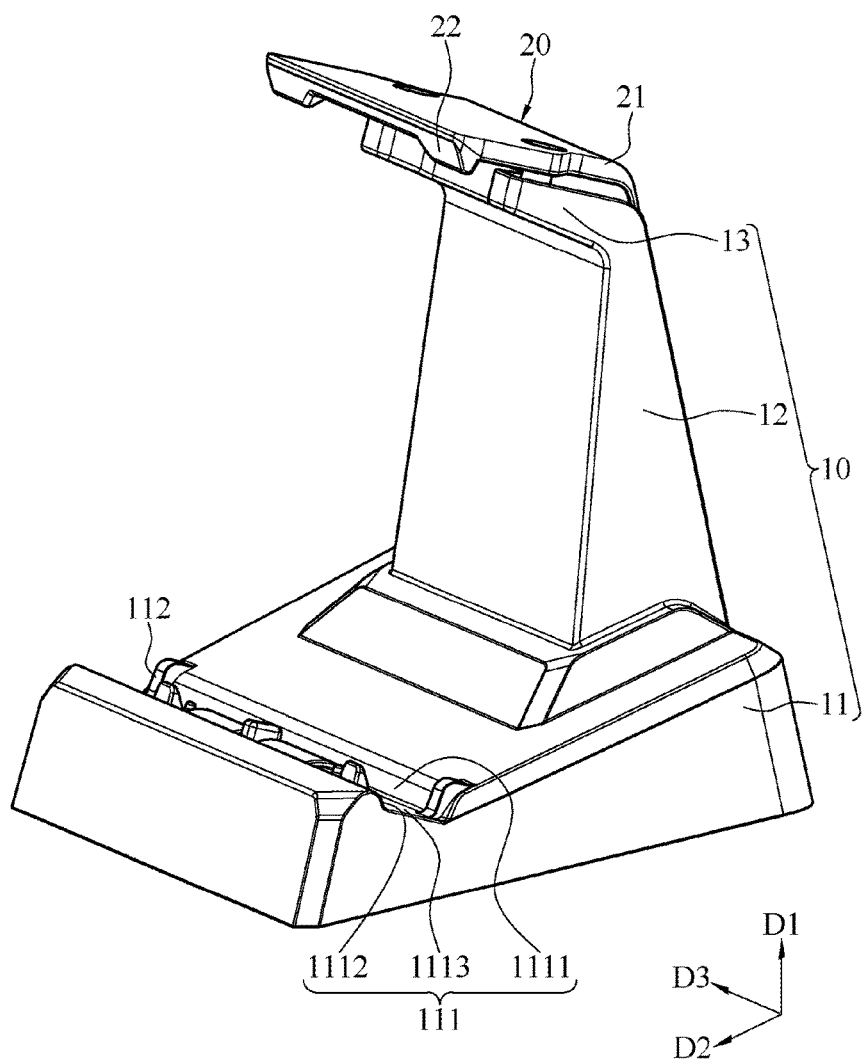
FIG. 1. is a perspective appearance schematic diagram of a docking station according to an embodiment of the present invention.
Figure 3:
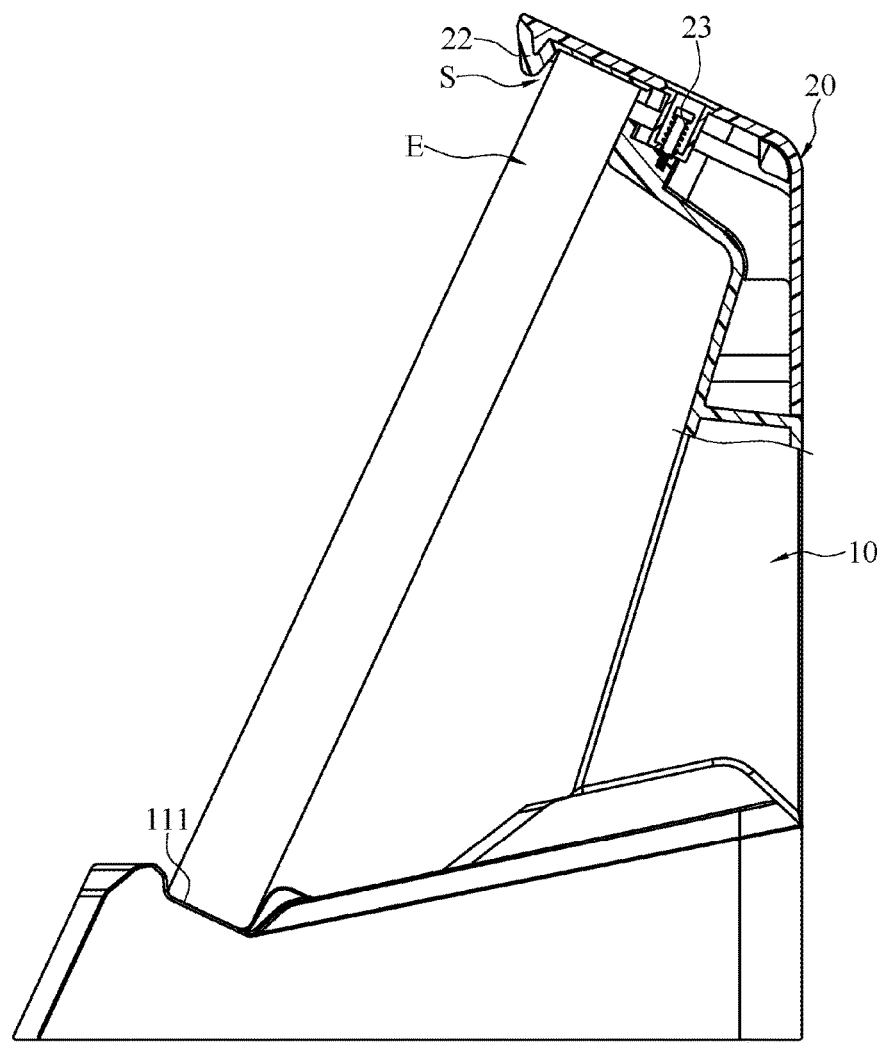
FIG. 3 is a schematic diagram of a docking station used in coordination with an electronic device according to an embodiment of the present invention.

Referring to FIG. 1 and FIG. 3, FIG. 1 shows a perspective appearance schematic diagram of a docking station according to an embodiment of the present invention; FIG. 3 shows a schematic diagram of a docking station used in coordination with an electronic device E according to an embodiment of the present invention. The docking station of the present invention can be combined with an electronic device E so as to support the electronic device E, thereby facilitating the use of the electronic device E for a user. The electronic device E may be, for example but not limited to, a tablet computer, a smart phone, a detachable laptop computer or a point of sales (POS) system.

Figure 2:
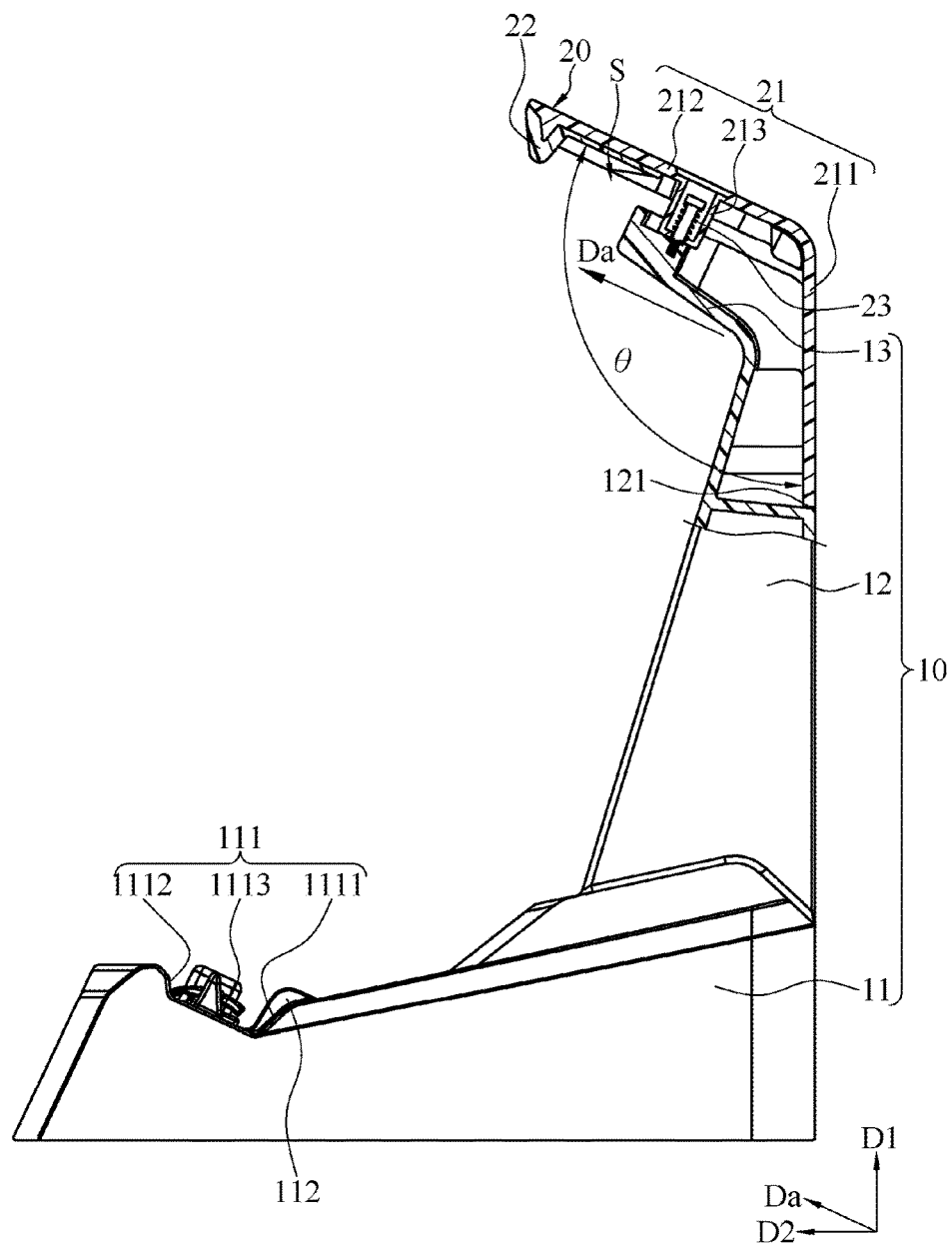
FIG. 2 is a section diagram of a docking station according to an embodiment of the present invention.

Referring to FIG. 1 and FIG. 2, FIG. 2 is a section diagram of a docking station according to an embodiment of the present invention; FIG. 1 and FIG. 2 depict that the docking station includes a base 10 and a clamp member 20. The base 10 includes a seat 11 and an extension portion 12 connected to the seat 11 and extending upwards. The clamp member 20 is assembled at the extension portion 12, and includes a body 21, a hook portion 22 and a resilient element 23. The body 21 is assembled at extension portion 12. The hook portion 22 is provided at an end portion of the body 21. The resilient element 23 is provided at the body 21 and near the hook portion 22. When the hook portion 22 receives a force, the body 21 is elastically deformed and drives the resilient element 23 to produce an elastic restoring force; when the hook portion 22 does not receive a force, the elastic restoring force of the resilient element 23 drives the body 21 to restore to an initial position.

Refer to FIG. 1 as well as FIG. 2. In this embodiment, the extension portion 12 extends along a first direction D1 from the seat 11; that is, one end of the extension portion 12 is joined at the seat 11 and the other end is located away from the base 11 along the first direction D1. At this point, one end of the extension portion 12 along the first direction D1 and away from the seat 11 is defined as an upper part, and one end of the extension portion 12 along the first direction D1 and close to the seat 11 is defined as a lower part. In this embodiment, the extension portion 12 extends upwards from the seat 11.

In one embodiment, a direction perpendicular to the first direction D1 is defined as a second direction D2, along which the joined position of the seat 11 and the extension portion 12 extends. As such, a stable perpendicular seat body form is formed between the seat 11 and the extension portion 12. It should be noted that, the seat 11 and the extension portion 12 are not limited to being perpendicularly connected.

Further refer to FIG. 1 to FIG. 3. In this embodiment, the body 21 of the clamp member 20 is a plate structure having an included angle. More specifically, the body 21 includes a first trunk section 211 and a second trunk section 212. The first trunk section 211 is provided at the extension portion 12, and an included angle θ exists between the first trunk section 211 and the second trunk section 212. Further, the first trunk section 211 may be provided at the extension portion 12 by means of, for example but not limited to, fastening. In this embodiment, the first trunk section 211 extends along the first direction D1, the second trunk section 212 extends along an angle direction Da, and an included angle greater than 90 degrees exists between the angle direction Da and the first direction D1. In the embodiment shown in FIG. 2, an included angle of 115 degrees exists between the angle direction Da and the first direction D1. With the included angle greater than 90 degrees between the extension direction of the second trunk section 212 and the first direction D1, the electronic device E can be more readily mounted between the clamp member 20 and the base 10.

Further, in this embodiment, the first trunk section 211 of the body 21 is attached at the extension portion 12, the second trunk section 212 is only partially attached at the extension portion 12, and a free end of the second trunk section 212 is an in-air free end. Accordingly, the section trunk section 212 of the body 21 of the clamp member 20 can be easily deformed when receiving a force.

Referring to FIG. 2, further, in this embodiment, the extension portion 12 may further have an indentation 121, in which the first trunk section 211 of the body 21 is placed. When the first trunk section 211 of the body 21 is provided at the extension portion 12, the first trunk section 211 of the body 21 is in a coplanar state with the extension portion 12 and does not protrude from the extension portion 12, hence minimizing a protruding part of the first trunk section 211 and further reducing the possibility of the body 21 falling off due to a force received on the first trunk section 211.

Referring to FIG. 2 and FIG. 3, the hook portion 22 of the clamp member 20 is provided at the in-air free end of the second trunk section 212 of the body 21. Accordingly, when the hook portion 22 of the clamp member 20 receives a force and becomes elastically deformed, the hook portion 22 is able to displace in the first direction D1; when the user moves the clamp member 20 to cause the body 21 of the clamp member 20 to become elastically deformed and the hook portion 22 displaces in the first direction D1, the space between the hook portion 22 of the clamp member 20 and the base 10 is enlarged to facilitate the mounting of the electronic device E therein.

Referring to FIG. 2 and FIG. 3, further, in this embodiment, the hook portion 22 is a protrusion structure having a triangular cross section, and protrudes from the in-air free end of the second trunk section 212 towards a direction of the base 10. In this embodiment, the base 10 may further include a stop portion 13, which is connected to the extension portion 12 and extends along the angle direction Da. Further, the extension length of the stop portion 13 in the angle direction D1 is smaller than the length of the second trunk section 212 of the body 21 of the clamp member 20. As such, in the angle direction Da, a clamp space S is formed between the free end of the stop portion 13 and the hook portion 22. The clamp space S is for accommodating the electronic device E, such that the electronic device E is positioned between the free end of the stop portion 13 and the hook portion 22.

Figure 4:
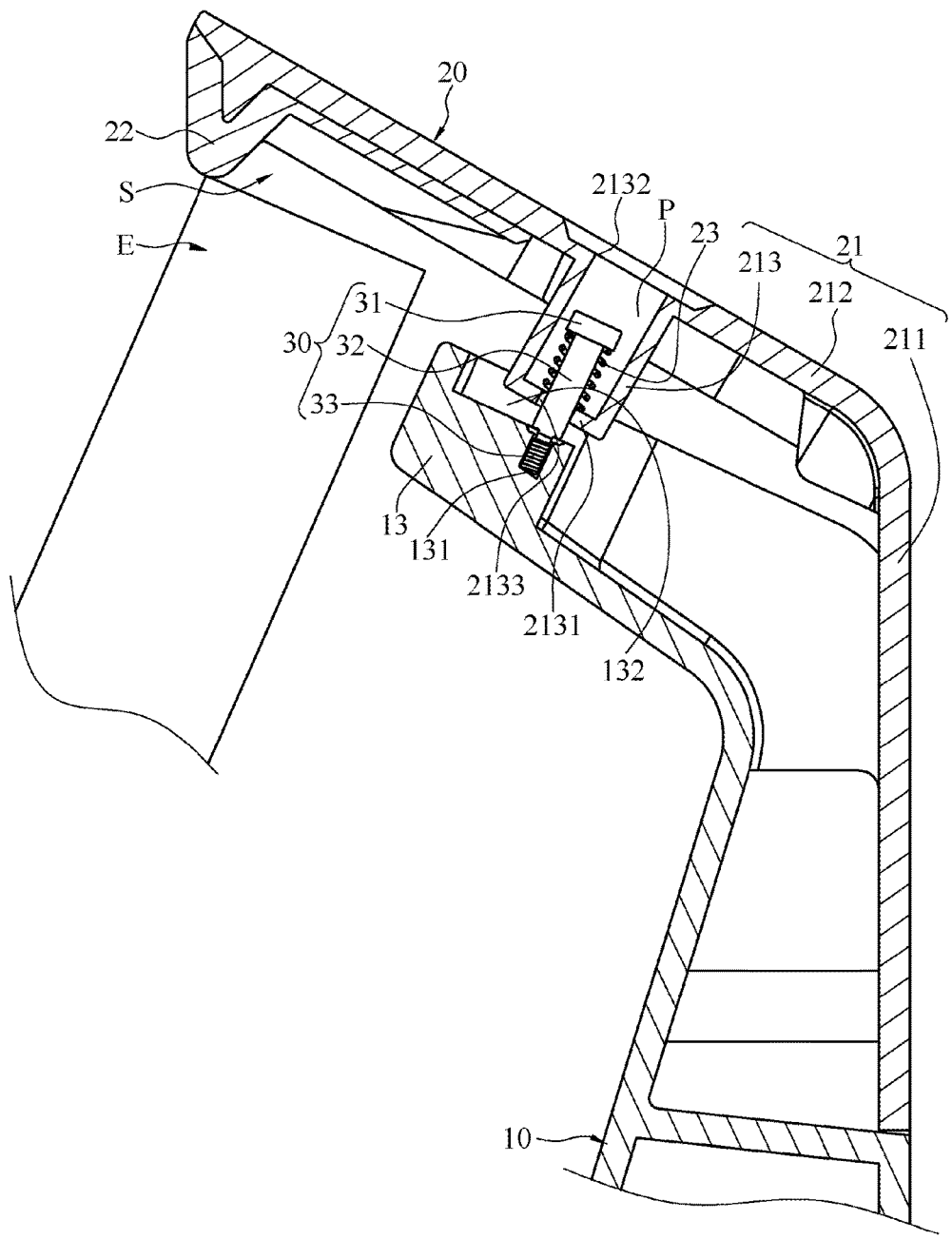
FIG. 4 is a partial structure of FIG. 3, and depicts an elastically deformed state of the clamp member.
Figure 5:
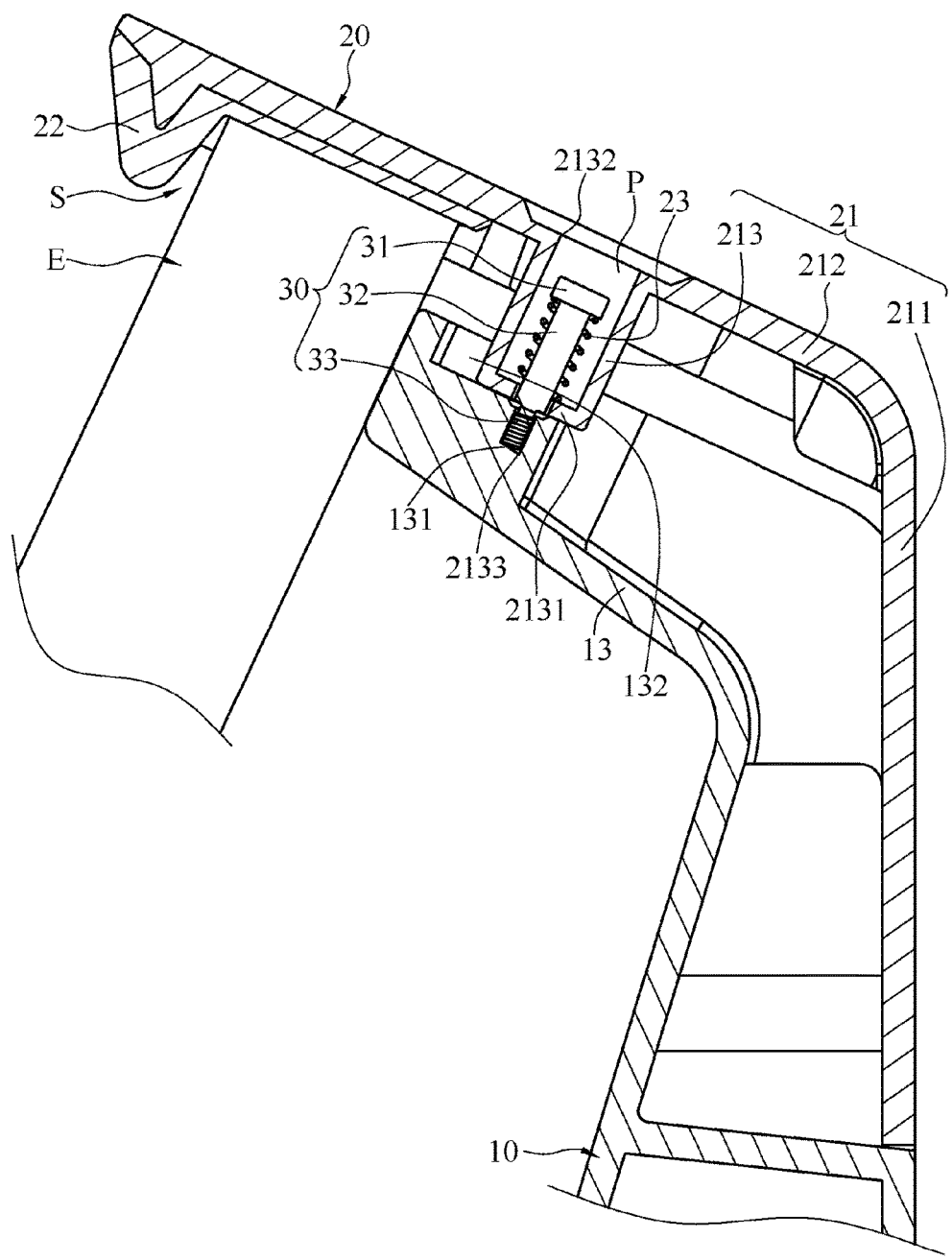
FIG. 5 is a partial structure of FIG. 3, and depicts an initial clamping state of the clamp member.

Referring to FIG. 4 and FIG. 5, FIG. 4 shows a partial structure of FIG. 3 and depicts an elastically deformed state of the clamp member 20; FIG. 5 shows a partial structure of FIG. 3 and depicts an initial clamping state of the clamp member 20. In this embodiment, the resilient element 23 is a compression spring, and the docking station further includes a force receiving member 30. The force receiving member 20 includes a sleeve tube 213. The sleeve tube 213 extends from the second trunk section 212 towards the stop portion 13 of the base 10, wherein one end of the sleeve tube 213 near the base 10 has an abutting wall 2131. Further, the sleeve tube 213 has an internal channel P, of which one end is joined with an open installation hole 2132 and the other end joined with a sleeve opening 2133 open at the abutting wall 2131.

Referring to FIG. 4 and FIG. 5, in this embodiment, the force receiving member 30 includes a head portion 31 and an insertion section 32. The outer diameter of the head portion 31 is greater than the outer diameter of the insertion section 32 and the inner diameter of the sleeve opening 2133, and the outer diameter of the insertion section 32 is smaller than or equal to the inner diameter of the sleeve opening 2133. At this point, the resilient element 23 is a coil spring and is accommodated in the channel P of the sleeve tube 213, and has one end thereof abutting against the abutting wall 2131, and the insertion section 32 of the force receiving member 30 passes through the resilient element 23 and the sleeve opening 2133 and is fixed at the base 10. When the force receiving member 30 is fixed at the base 10, the head portion 31 of the force receiving member 30 is abutted against the other end of the resilient element 23. Thus, because the resilient element 23 is a compression spring and two ends thereof are in normal extension when no force is received, the one end of the resilient member 23 that is abutted against the abutting wall 2131 can constantly apply a force upon the abutting wall 2131 towards a direction of the base 10, thereby constantly keeping the clamp member 20 in a clamping position close to the base 10.

Referring to FIG. 4, when the second trunk section 212 of the body 21 of the clamp member 20 receives a force in the first direction D1, the body 21 becomes elastically deformed and the second trunk section 212 displaces in the first direction D1. When the user wishes to mount the electronic device E and applies a force, along the first direction D1 and towards a direction away from the base 10, on the second trunk section 212 of the body 21 of the clamp member 20, the abutting wall 2131 of the sleeve tube 213 of the body 21 pushes the resilient element 23 and the sleeve tube 213 becomes displaced. Further, the resilient element 23 at the same time stores an elastic force for the user to mount the electronic device E between the clamp member 20 and the base 10 when the clamp member 20 is located away from the base 10.

Referring to FIG. 5, when the electronic device E is mounted between the clamp member 20 and the base 10, by releasing the force applied on the clamp member 20, the resilient element 23 releases the stored elastic force to push the abutting wall 2131, such that the sleeve tube 213 of the clamp member 20 restores to the position located close to the base 10, achieving the function of clamping the electronic device E.

Referring to FIG. 4 and FIG. 5, in this embodiment, the inner diameter of the installation hole 2132 of the sleeve tube 213 may be greater than the outer diameter of the head portion 31 of the force receiving member 30, thus enabling an installation operator to install the resilient element 23 or insert a tool through the installation hole 2132 to secure the force receiving member 30.

Referring to FIG. 4 and FIG. 5, the force receiving member 30 further includes a screw rod section 33, and the screw rod section 33 and the head portion 31 are respectively located at two ends of the insertion section 32. Correspondingly, one surface of the stop portion 13 of the base 10 facing the clamp member 20 has a screw hole 131, and the position of the screw hole 131 corresponds to the position of the sleeve opening 2133 of the sleeve tube 213. As such, for assembly, the resilient element 23 is accommodated in the channel P of the sleeve tube 213, and the force receiving member 30 is inserted into the sleeve tube 213 and the resilient element 23 through the installation hole 2132 of the clamp member 20. The installation operator can then extend a screw fastening tool from the installation hole 2132 into the channel P to screw and fasten the force receiving member 30, thus screwing and fastening the screw rod section 33 of the force receiving member 30 to the screw hole 131 on the base 10. As such, the force receiving member 30 can be securely positioned on the base 10, and can also serve as firm support for the resilient element 23, ensuring that the resilient element 23 reliably stores an elastic force when compressed by the abutting wall 2131 as well as ensuring that the clamp member 20 reliably restores to a clamping state when not receiving a force.

In this embodiment, the stop portion 13 of the base 10 has a slot 132, in which the screw hole 131 is located. The slot 132 has a slot depth, and a sleeve length exists between two ends of the sleeve tube 213 of the clamp member 20, wherein the sleeve length is greater than the slot depth. As such, when the clamp member 20 is assembled at the base 10, the second trunk section 212 of the clamp 20 leans and abuts against the slot 132 of the base 10 by one end of the sleeve tube 213 having the abutting wall 2131, whereas the remaining part of the second trunk section 212 and the stop portion 13 of the base 10 are in a distanced state. Accordingly, the area by which the second trunk section 212 of the clamp member 20 leaning against and attaching the stop portion 13 of the base 10 is reduced, allowing the elastic deformation and displacement to more easily take place when the second trunk section 212 receives a force and ensuring utilization convenience.

In one embodiment, to ensure that the appearance of the electronic device E assembled is free from scratch, the material of the hook portion 22 may be different from the material of the body 21. Further, the hardness of the material of the hook portion 22 may be less than the hardness of the material of the body 21. More specifically, the material of the body 21 may be a plastic material, and the material of the hook portion 22 may be, for example but not limited to, rubber or silicone. Thus, when the user wishes to accommodate the electronic device E into the clamp space S between the hook portion 22 and the stop portion 13, it is ensured that the hook portion 22 does not scratch the appearance of the electronic device E while the electronic device E applies a force and contacts the hook portion 22.

Referring to FIG. 1 to FIG. 3, in this embodiment, to ensure the stability of the electronic device E mounted on the docking station, the seat 11 of the base 10 further includes a groove 111. Further, the groove 111 has a first side surface 1111, a second side surface 1112 and a lower surface 1113. The first side surface 1111 and the second side surface 1112 are opposite and are respectively connected to the lower surface 1113. When the electronic device E is mounted at the docking station, two opposite ends of the electronic device E can be respectively accommodated in the clamp space S and the groove 111, and the two opposite ends of the electronic device E may further respectively abut against the clamp member 20 and the lower surface 1113 of the groove 111; moreover, the first side surface 1111 and the second side surface 1112 of the groove 111 can limit the displacement of the electronic device E in the second direction D2 in the groove 111, accordingly maintaining the stability of the electronic device E mounted at the docking station.

Referring to FIG. 1 to FIG. 3, further, in this embodiment, the lower surface 1113 of the groove 111 is a slanted plane compared to the second direction D2. Accordingly, when the electronic device E is mounted at the docking station, the electronic device E is positioned at an inclined angle, further facilitating viewing or utilization for the user.

Referring to FIG. 1 and FIG. 2, further, in this embodiment, a direction perpendicular to the first direction D1 and the second direction D2 is defined as a third direction D3. To further ensure the stability of the electronic device E in the third direction D3 when the electronic device E is mounted at the docking station, the base 11 may further include two side stop portions 112, which are arranged in the third direction D3 at an interval and adjacent to the second side surface 1112 of the groove 111. Accordingly, when the electronic device E is mounted at the docking station, the side stop portions 112 limit the displacement of the electronic device E in the third direction D3, ensuring the stability of the electronic device E in the third direction D3 when the electronic device E is mounted at the docking station.

While the invention has been described by way of example and in terms of the preferred embodiments, it is to be understood that the invention is not limited thereto. Various modifications and similar arrangements and procedures made by a person skilled in the art without departing from the spirit of the present invention are encompassed within the scope of the present invention, and the scope of the present invention therefore should be accorded with the broadest interpretation of the appended claims.

What is claimed is:

1. A docking station, comprising:
 a base, comprising a seat, an extension portion connected to the seat and extending upwards, and a stop portion connected to the extension portion and extending along an angle position;
 a clamp member, assembled at the extension portion, the clamp member comprising:
  a body, assembled at the extension portion;
  a hook portion, provided at an end portion of the body, wherein a clamp space exists in the angle direction between a free end of the stop portion and the hook portion; and
  a resilient element, provided at the body and near the hook portion;
 wherein, when the hook portion receives a force, the body becomes elastically deformed and drives the resilient element to produce an elastic restoring force; when the hook portion does not receive the force, the elastic restoring force of the resilient element drives the body to restore to an initial position.

2. The docking station according to claim 1, wherein the hook portion and the body are made of different materials.

3. The docking station according to claim 1, wherein the seat of the base further comprises a groove.

4. The docking station according to claim 3, wherein the seat of the base further comprises two side stop portions, and the side stop portions are adjacent to the groove.

5. The docking station according to claim 1, wherein the body comprises a first trunk section and a second trunk section, the first trunk section is fastened at the extension portion, and an included angle exists between the first trunk section and the second trunk section.

6. The docking station according to claim 5, further comprising a force receiving member, the resilient element is a compression spring, one end of the force receiving member is fixed at the extension portion and one other end has a head portion, the resilient element sleeves between the two ends of the force receiving member, the second trunk section of the body movably sleeves the force receiving member, and two ends of the resilient element are respectively abutted against the body and the head portion.

7. The docking station according to claim 5, wherein the extension portion has an indentation, in which the first trunk section of the body is accommodated.

8. A docking station, comprising:
   a base, comprising a seat, and an extension portion connected to the seat and extending upwards;
   a clamp member, assembled at the extension portion, the clamp member comprising:
      a body, assembled at the extension portion, wherein the body comprises a first trunk section and a second trunk section, the first trunk section is fastened at the extension portion, and an included angle exists between the first trunk section and the second trunk section;
      a hook portion, provided at an end portion of the body; and
      a resilient element, provided at the body and near the hook portion;
   wherein, when the hook portion receives a force, the body becomes elastically deformed and drives the resilient element to produce an elastic restoring force; when the hook portion does not receive the force, the elastic restoring force of the resilient element drives the body to restore to an initial position.

9. The docking station according to claim 8, wherein the hook portion and the body are made of different materials.

10. The docking station according to claim 8, wherein the seat of the base further comprises a groove.

11. The docking station according to claim 10, wherein the seat of the base further comprises two side stop portions, and the side stop portions are adjacent to the groove.

12. The docking station according to claim 8, further comprising a force receiving member, the resilient element is a compression spring, one end of the force receiving member is fixed at the extension portion and one other end has a head portion, the resilient element sleeves between the two ends of the force receiving member, the second trunk section of the body movably sleeves the force receiving member, and two ends of the resilient element are respectively abutted against the body and the head portion.

13. The docking station according to claim 8, wherein the extension portion has an indentation, in which the first trunk section of the body is accommodated.

* * * * *